US012806638B2

(12) United States Patent
Blaauw

(10) Patent No.: US 12,806,638 B2
(45) Date of Patent: Nov. 24, 2026

(54) SPRAY NOZZLE FOR AN AGRICULTURAL DEVICE, SPRAYING SYSTEM WITH SAID NOZZLE, AN AGRICULTURAL DEVICE WITH SAID NOZZLE AND A METHOD FOR DISPENSING A LIQUID

(71) Applicant: EXEL Industries, Epernay (FR)

(72) Inventor: Doeko Blaauw, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 185 days.

(21) Appl. No.: 18/733,431

(22) Filed: Jun. 4, 2024

(65) Prior Publication Data

US 2024/0408630 A1 Dec. 12, 2024

(30) Foreign Application Priority Data

Jun. 7, 2023 (NL) ..................................... 2035025

(51) Int. Cl.

*B05B 7/04* (2006.01)
*A01C 23/04* (2006.01)
*A01M 7/00* (2006.01)
*B05B 7/12* (2006.01)

(52) U.S. Cl.

CPC .......... *B05B 7/0416* (2013.01); *A01C 23/047* (2013.01); *A01M 7/0042* (2013.01); *A01M 7/0089* (2013.01); *B05B 7/1254* (2013.01)

(58) Field of Classification Search

CPC ... B05B 7/0416; B05B 7/1254; A01C 23/047; A01M 7/0042; A01M 7/0089
USPC .......................................................... 239/407
See application file for complete search history.

(56) References Cited

U.S. PATENT DOCUMENTS 4,899,937 A 2/1990 Haruch
5,574,657 A * 11/1996 Tofte .................. A01M 7/0092 700/240
6,013,108 A * 1/2000 Karolys ................ G01D 3/022 710/72
6,321,130 B1 * 11/2001 Ferenczi ............ G05B 23/0213 700/95

(Continued)

FOREIGN PATENT DOCUMENTS

AU 2019374062 A1 5/2021
GB 2337984 A 12/1999

(Continued)

OTHER PUBLICATIONS

Search Report fand Written Opinion for NL2035025, mailed Dec. 20, 2023.

*Primary Examiner* — Chee-Chong Lee
(74) *Attorney, Agent, or Firm* — KDW Firm PLLC

(57) ABSTRACT

A spraying nozzle for an agricultural device, a spraying system and agricultural machine provided therewith and method therefor. The spraying nozzle includes a body and a nozzle head, the body comprising a first inlet chamber, a second inlet chamber, and a mixing chamber. The first inlet chamber includes a first inlet configured to receive a first fluid under a first pressure and a first outlet that is fluidly connected to the mixing chamber, and the second inlet chamber comprises a second inlet configured to accept a second fluid under a second pressure and a second outlet that is fluidly connected with the mixing chamber. The mixing chamber is fluidly connected to the nozzle head.

18 Claims, 5 Drawing Sheets

(56) References Cited

U.S. PATENT DOCUMENTS

| | | | | |
|---|---|---|---|---|
| 6,402,048 | B1 * | 6/2002 | Collins | B05B 3/14 239/69 |
| 6,424,295 | B1 * | 7/2002 | Lange | A01C 23/007 701/469 |
| 6,726,120 | B2 * | 4/2004 | Schaffter | A01M 7/0089 239/69 |
| 6,926,211 | B2 * | 8/2005 | Bryan | A01M 7/0014 239/311 |
| 9,743,655 | B2 * | 8/2017 | Hillger | A01M 7/0089 |
| 10,165,736 | B2 * | 1/2019 | Bermudez Rodriguez | A01B 79/00 |
| 10,427,179 | B2 | 10/2019 | Posselius | |
| 11,607,703 | B2 * | 3/2023 | Smith | A01M 7/0053 |
| 2004/0169093 | A1 | 9/2004 | Strong | |

FOREIGN PATENT DOCUMENTS

| | | | |
|---|---|---|---|
| WO | 2012001683 | A2 | 1/2012 |
| WO | 2020092686 | A1 | 5/2020 |

* cited by examiner

SPRAY NOZZLE FOR AN AGRICULTURAL DEVICE, SPRAYING SYSTEM WITH SAID NOZZLE, AN AGRICULTURAL DEVICE WITH SAID NOZZLE AND A METHOD FOR DISPENSING A LIQUID

CROSS-REFERENCE TO RELATED APPLICATIONS

This application claims priority to Netherlands Patent Application serial no. 2035025, Jun. 7, 2023, the entirety of which application is incorporated by reference herein.

FIELD OF THE DISCLOSURE

The present invention relates to a spraying nozzle for an agricultural device, a spraying system with said nozzle, an agricultural device with said nozzle and a method for dispensing a liquid product using such a device over a surface to be sprayed, such as an agricultural field. The present invention is applicable in the agricultural field in order to spray field with, for example, a liquid phytosanitary product, such as a fertilizer, a pesticide, or other type.

BACKGROUND

Spraying nozzles are used in agricultural devices for dispensing a liquid over a surface of a field. Agricultural devices for dispensing a liquid over a surface of a field, such as an agricultural field, are known from practice. Such devices comprise a spraying system, said system comprising a spray boom or, in short, a boom comprising a number of consecutive ducts for transporting a liquid to be sprayed. The consecutive ducts together form a longitudinal supply line from a liquid product supply to nozzles that are consecutive positioned along the boom and from which the liquid is sprayed.

In some of the conventional systems so called twin-fluid nozzles are used, in which the liquid to be sprayed is mixed with air under pressure to create a spectrum of droplets, which ensures a good and even coverage of the field and/or plants that are sprayed. In such spraying systems the boom comprises a secondary longitudinal supply line to supply air from an air supply system to the twin-fluid nozzles. In such spraying systems, both the liquid to be sprayed and the air are pressurized.

In order to reduce both the environmental impact and the costs involved with spraying fields, a need has arisen to increase control over the amount and location of the liquid that is to be dispensed. Therefore, developments have been made in so called section control, which allow agricultural devices to selectively open and close (groups and/or sections of) individual nozzles such that only those areas of the field are sprayed that need to be sprayed. However, when closing a twin-fluid nozzle, both the water and air line have to be shut-off separately using air operated or electrically operated valves. Only shutting of the liquid product supply would cause an air leak through the nozzle, causing unacceptable levels of fine droplets and loosing too much air to maintain air pressure and volume for the rest of the spray nozzles on the boom. A problem with these systems is that, compared to a conventional spraying system, a double amount of shut-off valves is needed to do section control on a sprayer equipped with twin-fluid nozzles. This adds costs, complexity and weight and requires more space to fit the components.

SUMMARY OF THE DISCLOSURE

The present invention has for its objective to obviate or at least reduce one or more of the aforementioned problems.

Therefore, the invention provides a spraying nozzle for an agricultural device, the spraying nozzle comprising a body and a nozzle head, the body comprising:

a first inlet chamber;

a second inlet chamber; and a mixing chamber, wherein the first inlet chamber comprises a first inlet configured to receive a first fluid under a first pressure and a first outlet that is fluidly connected to the mixing chamber;

wherein the second inlet chamber comprises a second inlet configured to accept a second fluid under a second pressure and a second outlet that is fluidly connected with the mixing chamber, and wherein the mixing chamber is fluidly connected to the nozzle head;

wherein the second inlet chamber further comprises a stopping element configured to be moveable between a stopping position in which a connection between the second inlet and the second outlet is fluidly closed, and an open position in which the connection between the second inlet and the second outlet is fluidly open, and wherein the stopping element is operatively connected to a holding element configured to hold the stopping element in the stopping position; and wherein the body further comprises a separating element positioned between the first inlet chamber and the second inlet chamber and wherein the separating element is operatively connected to the stopping element and is configured to move the stopping element towards the open position in reaction to the first fluid entering the first inlet chamber.

An advantage of the spray nozzle according to the invention is that the first fluid doubles as a medium for opening the stopping element, which means the opening of the stopping element is automatically synchronized with the feeding of first fluid to the spraying nozzle, reducing for the need for a separate controller which saves costs and weight and is less complex compared to conventional systems.

It is noted that the holding element is configured to hold the stopping element in the stopping position by applying a holding force on the stopping element, optionally an elastic force in case the holding element is an elastic element. It is further noted that the first pressure is sufficient to move the stopping element towards the open position, overcoming the holding force that is applied to the stopping element by the holding element.

In an embodiment of the invention, the separating element is a membrane or a sealed plunger.

In one of the presently preferred embodiments of the invention the holding element is a spring, preferably a metal spring.

An advantage of this embodiment is that a spring provides a predictable holding force and has a relative long lifetime.

In a presently preferred embodiment according to the invention, the first fluid is a liquid to be sprayed and the second fluid is air.

An advantage of this embodiment is that, in most application, the pressure of the liquid to be sprayed (i.e. the first pressure) is higher than the pressure of the air (e.g. the second pressure), which means the holding force of the holding element is more easily and quicker overcome when the first fluid is the liquid to be sprayed.

It will be understood that the liquid to be sprayed may comprise any liquid appropriate to be used as a base liquid for spraying a field, such as, for example, (tap) water, ground water, or a premixed base liquid, or any other liquid appropriate to be used as liquid to be sprayed. It will be understood that the liquid to be sprayed can also be derived from mixing a concentrate substance or a powdered substance with an appropriate mixing liquid such as (tap) water.

It will be further understood that the liquid additive may comprise any liquid additive appropriate to be mixed with the base liquid, for example, a pesticide concentrate, such as an herbicide, a fungicide, or an insecticide; a liquid fertilizer; or any other liquid crop treatment concentrate. It will be understood that the liquid additive might also be derived by mixing a powder or concentrate with an appropriate mixing liquid.

In an embodiment according to the invention, the first inlet chamber comprises an obstruction element that is configured to direct the first fluid from the first inlet along a first surface of the separating element towards the first outlet.

An advantage of this embodiment is that due to the obstruction element being configured to direct the first fluid along a first surface of the separating element towards the first outlet is that the separating element is more directly engaged by the first fluid, resulting in a more predictable movement of the stopping element.

Another advantage of this embodiment is that, by the first fluid being directed along the first surface of the separating element, this prevents a potential build-up of solid particles in front of the separating element, this is especially advantageous in application wherein the liquid to be sprayed comprises a suspension of solids.

In a further advantageous embodiment according to the invention, the first inlet chamber comprises a first channel fluidly connected to the first inlet and a second channel fluidly connected to the first outlet, the first and second channel both extending in a first direction that is substantially parallel to the first surface of the separating element and wherein the obstruction element is positioned between the first and second channel and comprises at least two directing channels that are positioned substantially perpendicular to the first direction and which are configured to direct a flow from the first channel along the first surface of the separating element to the second channel.

In a further embodiment according to the invention, the first chamber comprises an elongated chamber body, wherein the first channel and the second channel both partly extends in the first direction through the elongated chamber body and wherein the at least two directing channels comprises a first direction channel that is positioned near an end of the first channel and a second direction channel that is comprised near an end of the second channel, and wherein the first direction channel and the second direction channel both comprise one or more radiating channels and a surrounding channel, wherein the radiating channels extends between respectively the first channel or the second channel and the corresponding surrounding channel, and wherein the surrounding channels are both comprised in a wall of the elongated body in a plane that is substantially perpendicular to the first direction and wherein the respective surrounding channels are fluidly connected with each other with an open space that is in positioned in front of the first surface of the separating element.

In an embodiment according to the invention, the first outlet comprises a flow constriction element comprising a passage with a predetermined diameter that is smaller than the diameter of the first inlet chamber.

An advantage of having a flow constriction element is that a volume of the liquid that enters into the mixing chamber depends on the predetermined diameter. Thus, by having the flow constriction element, the dosing volume of the liquid that enters into the mixing chamber can be regulated. Another advantage of this embodiment is that, due to the constriction, the flow speed of the fluid is increased relative to the flow speed in the first inlet chamber, which results in a better mixing of the first and second fluid in the mixing chamber.

In a further embodiment according to the invention, the first inlet chamber is removably comprised in the body and wherein the flow constriction element is replaceable comprised in the first outlet.

An advantage of this embodiment is that the first inlet chamber and/or the flow constriction element can be repaired or replaced when it is damaged, clogged up or is otherwise malfunctioning.

Another advantage of this embodiment is that the flow constriction element can be replaced for one with a different predetermined diameter, depending on a desired flow speed, on a desired final pressure, and/or on a type of liquid to be sprayed.

In an embodiment according to the invention, the nozzle head is removably connected to the mixing chamber.

An advantage of this embodiment is that the nozzle head can be repaired or replaced when it is damaged, clogged up or is otherwise malfunctioning.

Another advantage of this embodiment is that the nozzle head can be replaced for a nozzle head with different spraying characteristics, depending on the required spraying characteristics, such as, a desired spray width, a desired spraying height, a desired spraying velocity, a desired droplet size etc.

In an embodiment according to the invention, a distance the stopping element moves towards the open position positively correlates with the first pressure.

It is noted that, when the stopping element is partly between the stopping position and the open position, the connection between the second inlet and the second outlet is still fluidly open, but the size of a resulting opening is smaller relative to when the stopping element is in the open position. In an example, the stopping element is proportionally opened depending on the first pressure.

An advantage of this embodiment is that the flow of the second fluid after passing past the stopping element is automatically adapted in dependence with the first pressure of the first fluid.

In an embodiment according to the invention, the second inlet chamber is removably comprised in the body and the holding element is replaceable comprised in the second inlet chamber.

An advantage of this embodiment is that the holding element can be repaired or replaced when it is damaged, clogged up or is otherwise malfunctioning.

Another advantage of this embodiment is that the holding element can be replaced for a different holding element, for example an element having a different associated elastic resistance, resulting in a difference holding/elastic force being applied to the stopping element. This allows the user of the valve to adapt the holding element depending on the circumstances of use thereof, for example, it allows the user to adapt the holding element depending on the first pressure used.

The invention further relates to a spraying system for an agricultural device, the spraying system comprising a main supply for supplying a liquid to be sprayed, wherein the main supply is operatively connected to a main pumping system via a first supply line and wherein the main pumping system is operatively connected via a second supply line to the first inlets of a plurality of spraying nozzles according to the invention, and wherein the spraying system further comprising an air supply system operatively connected to the second inlets of the plurality of spraying nozzles and configured to supply the second fluid to the spraying nozzles.

The spraying system according to the invention provides the same or similar effects and advantages as the spray valve according to the invention.

A further advantage is that the air supply is automatically shut on and off in the spraying nozzles during use of the system in dependence to whether the main pumping system delivering the liquid to be sprayed to the nozzles or not, which means a separate valve and control system is not needed, thus making the system less complicated, lighter and cheaper.

In an embodiment according to the invention, the spraying system comprises one or more control valves positioned between the main pump and the plurality of spraying nozzles and wherein the spraying system further comprises a spray control system operatively connected to the one or more control valves and configured to control the opening and closing thereof.

An advantage of this embodiment is that the spraying system does not need separate valves for the air supply corresponding to the control valves nor has the spray control system to be configured to synchronize the opening and closing of said valves with the control valves, resulting in a simpler, lighter, and cheaper system.

In an embodiment according to the invention, the one or more control valves comprises pulse width modulation valves, pulse width and frequency modulation valves and/or on/off valves.

In an embodiment according to the invention, the plurality of spraying nozzles are grouped in a plurality of spraying groups, each spraying group with an associated control valve and/or wherein each spraying nozzles has an associated control valve.

An advantage of this embodiment is that all spraying nozzles (or groups thereof) can be controlled separately, resulting in more control of which areas of the field to be sprayed are sprayed, resulting in less liquid to be sprayed being applied, which results in a reduction of spraying cost and a reduction of the environmental impact of the spraying.

The invention further also relates to an agricultural device for dispensing a liquid product to be sprayed over a surface, such as an agricultural field, the agricultural device comprising a spraying system according to an embodiment of the invention, wherein the machine further comprises at least one boom along which the plurality of spraying nozzles are positioned.

The agricultural device according to the invention has the same or similar effects and advantages as the spraying nozzles and/or the spraying system.

In an embodiment according to the invention, the machine further comprises a detection system that is positioned on the boom and/or in front of the agricultural device and is configured to provide detection data comprising information on the surface to be sprayed to the spray control system and wherein the spray control system is configured to control the one or more control valves in accordance with the detection data; and preferably wherein the detection data comprises one or more plant characteristics and/or field characteristics.

An advantage of this embodiment is that the one or more control valves can be controlled such that the liquid to be sprayed is only sprayed from nozzles (or nozzle groups) when deemed necessary depending on the detection data.

It is noted that plant characteristics may comprise information about individual crops or weeds in front of the agricultural device. Detection information may further comprise information regarding the field to be sprayed, such as soil composition, soil hydration information and other relevant soil information. It is also noted that the detection information may further comprise other information relevant to spraying the field. It is further noted that controlling the control valves may comprise opening or closing one or more valves and/or controlling an amount of liquid to be sprayed that flows through the valves by, for example, controlling a time the control valve is open and/or a to what extend the control valve is open.

In an additional or alternative embodiment according to the invention, the machine further comprises:

- a positioning system that is configured to provide position data, wherein the position data comprises a real-time position of the agricultural device;
- memory with a map containing field information stored thereon;

and wherein the spray control system is further configured to receive the position data and field information and control the one or more control valves in accordance with the field information corresponding to the position data.

An advantage of obtaining one or more of a position data, a field information and/or a plant characteristic and controlling the one or more control valves, is that the amount of liquid can be adjusted according to different situations encountered when spraying a field.

In an embodiment according to the invention, the agricultural device is self-propelling.

An advantage of this embodiment is that no separate machine is needed to move the agricultural device.

The invention further also relates to a method for dispending a liquid to be sprayed over a surface, such as an agricultural field, the method comprising the steps of:

- providing an agricultural device according to the invention;
- dispensing the liquid to be sprayed by using the main pumping system to supply the liquid to the sprayed to the spraying valves, optionally opening and/or closing one or more control valves.

The method has the same or similar effects and advantages as the spray valve, spraying system and/or agricultural device according to the invention.

In an embodiment according to the invention, the method further comprises the steps of:

- obtaining one or more of a position data, a field information and/or a plant characteristics;
- determining an amount of liquid to be sprayed in response to the one or more of the position data, the field information and/or the plant characteristics; and
- opening and/or closing one or more control valves in accordance with the determined amount of liquid to be sprayed.

An advantage of obtaining one or more of a position data, a field information and/or a plant characteristics and adjusting the amount of liquid to be sprayed, is that the amount of liquid can be adjusted according to different situations encountered when spraying a field.

BRIEF DESCRIPTION OF THE DRAWINGS

The invention is described in the foregoing as an example. It is understood that those skilled in the art are capable of realizing different variants of the invention without actually departing from its scope. Further advantages, features and details of the invention are elucidated on the basis of preferred embodiments thereof, wherein reference is made to the accompanying drawings, in which.

DETAILED DESCRIPTION

Figure 1:
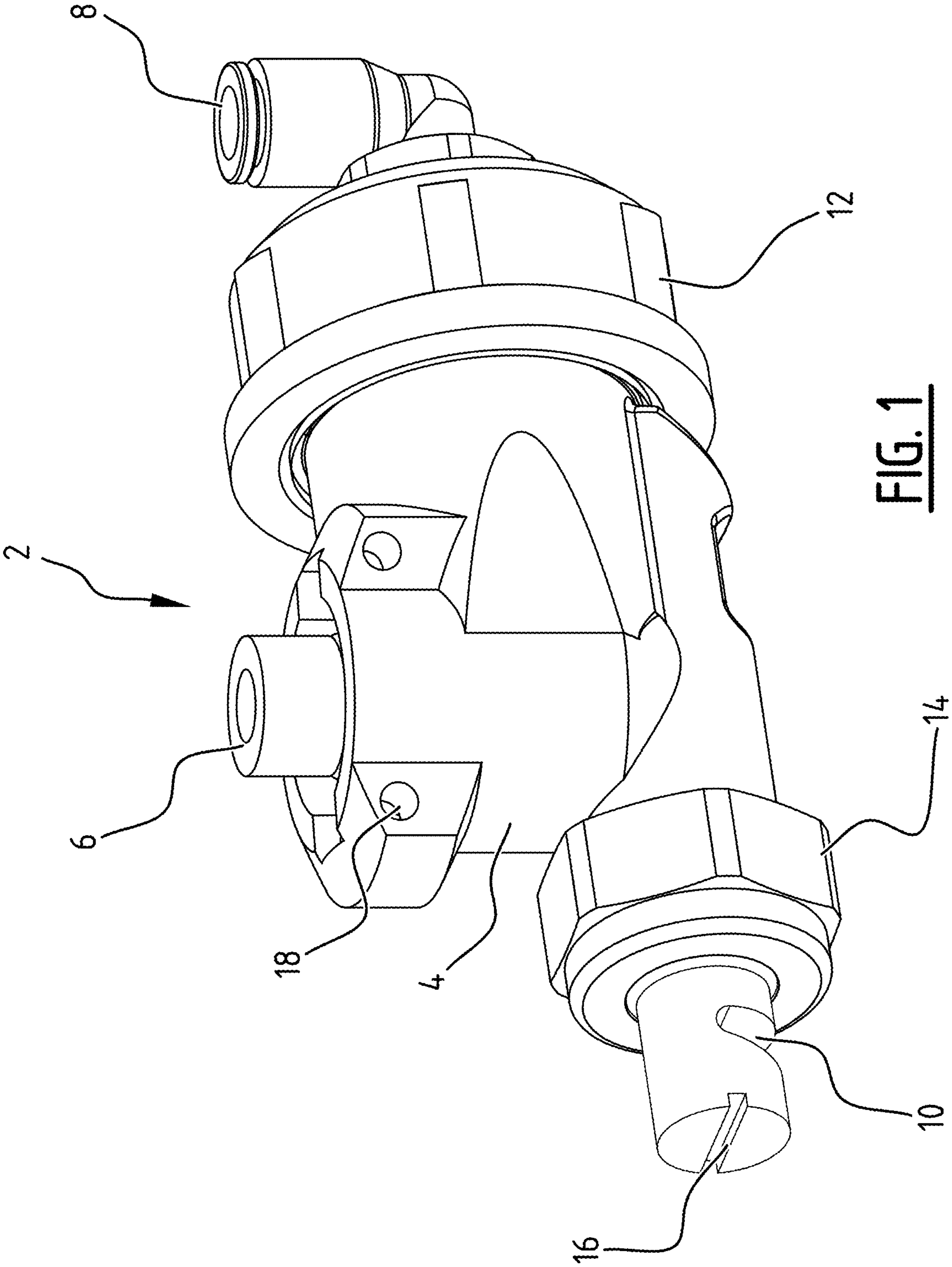
FIG. 1 shows a perspective view of an example of spraying nozzle according to the invention.

Spraying nozzle 2 according to an example of the invention (FIGS. 1 and 2A-B) comprises body 4 with first inlet chamber 6 and second inlet chamber 8, mixing chambers 26 and 28, and nozzle head 16.

In the illustrated embodiment first inlet chamber 6 is removably comprised in body 4 and is held in place by connecting liquid supply line (not shown) to first inlet chamber 6 using connection points 18. O-rings 54*a*-54*d* ensure that the connection between body 4 and first inlet chamber 6 is fluidly closed.

In the illustrated embodiment also second inlet chamber 12 is removably comprised in body 4 using treaded coupling 48. Second inlet 8 can be used to connect air supply line (not shown) to second inlet chamber 12. O-rings 54*c* and 54*f* ensure that that the connection between body 4 and second inlet chamber 12 is fluidly closed.

Nozzle head 16 has a spraying opening 10 with an associated spraying angle determined by the shape of opening 10. Nozzle head 16 is connected to body 4 via treaded coupling 14. Gasket 66 ensures that the connection between body 4 and nozzle head 16 is fluidly closed. Nozzle head 16 further has guiding element 32 and narrowing channel 30 to influence spraying characteristics, such as spray width, spray velocity and droplet size of nozzle head 16.

First inlet chamber 6 is connected to mixing chambers 26 and 28 via first inlet 22 that is connected with directing channels 68 towards flow constriction element 60 which is openly connected to mixing chamber 26 via passage 62.

Directing element 64 ensures that liquid to be sprayed that is passing through first inlet 22 is guided via directing channels 68 towards membrane 44 that is positioned between first inlet chamber 6 and second inlet chamber 12. In an example, directing element 64 is positioned about perpendicular to first inlet 22 and is monolithically formed with first inlet chamber 6 and wherein one or more locations at which directing element 64 and first inlet chamber 6 are connected are reinforced by one or more supporting elements (not shown) configured to support direct element 64 against deformations by fluids entering first inlet 22.

Flow constriction element 60 is removably positioned between first inlet chamber 6 and body 4 and can for example swapped out to change the diameter of passage 62. Second inlet chamber 12 is connected to mixing chambers 26 and 28 via second inlet 24 that is connected to second outlet channel 36 via space 34.

It is noted that in some embodiment, second outlet channel 36 comprises two (or more) channels, preferably running in parallel.

Stopping element 50 is positioned in space 34 of second inlet chamber 12 and is configured to fluidly close the connection between second inlet channel 22 and second outlet channel 36 when held in stopping position (FIG. 2A) by spring 42. Membrane 44 is operatively connected to stopping element 50 and stopping blocks 52.

Figure 2A:
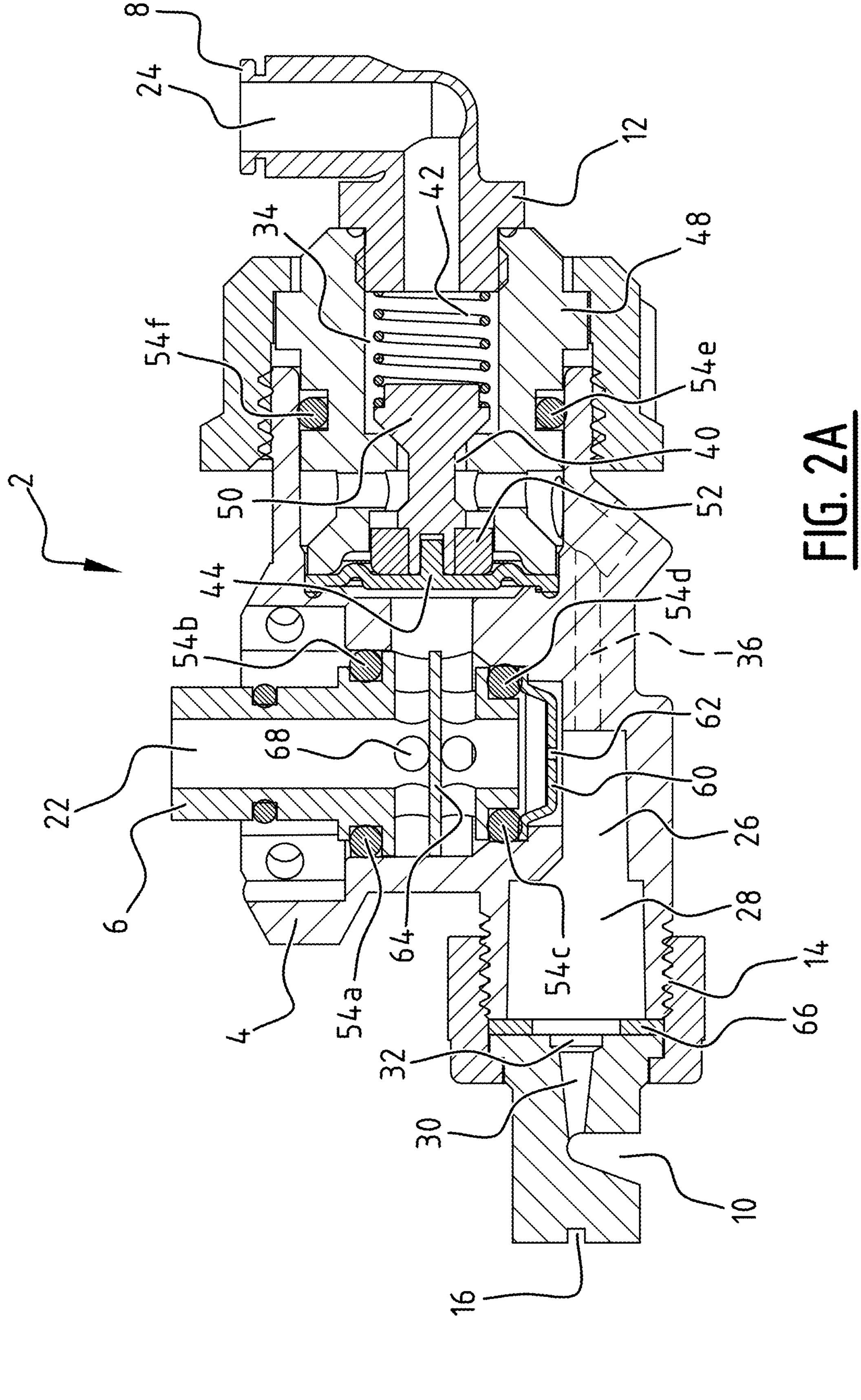
FIG. 2A shows an intersection of the spraying nozzle of FIG. 1 in a closed position.

During use of valve 2, first inlet chamber 6 is connected to a liquid product supply (not shown) configured to supply a pressurized liquid to be sprayed to first inlet 22 and second inlet chamber 12 is connected to an air supply (not shown) to supply pressurized air to second inlet 24. It is noted that during normal use, pressurized air is supplied constantly, while liquid to be sprayed is supplied on demand. When liquid to be sprayed is not supplied, stopping element 50 is held in stopping position by spring 42 and prevents pressurized air to flow from space 34 to second outlet 36 (FIG. 2A).

When during use (FIG. 2B), liquid to be sprayed enters first inlet 22 in direction F3, it is guided by directing element 64 in direction F5 through directing channels 68 towards membrane 44 through the other direction channels (not numbered) in direction F9 flow constriction element 60, where it passes through passage 62 in direction F11 to mixing chamber 26 and 28.

Due to the pressure of the liquid to be sprayed acting against the surface of membrane 44, membrane 44 expands towards stopping element 50 in direction F7, overcoming the combined force of holding force of spring 42 and the air pressure and moves stopping element 50 to the open position. Optionally, stopping blocks 52 abuts a wall of space 34 when membrane 44 expands to ensure that stopping element 50 does not move past the open position. When stopping element is moved from the stopping position (FIG. 2A) towards the open position (FIG. 2B), the connection between second inlet 24 and second outlet 36 becomes fluidly open, causing air to flow from second inlet 24 in direction F1, through space 34, passed the stopping element in direction F13 and through second outlet 36 in direction F15 towards mixing chambers 26 and 28. It is noted that it is not necessary in all application for stopping block 50 to move all the way to the open position, as the connection between second inlet 24 and second outlet 36 becomes fluidly open is also fluidly open when stopping block 50 is in between the stopping position and open position.

After the liquid to be sprayed enters inlet chamber 22 and moves stopping block 50 towards the open position, the fluid to be sprayed and air enter mixing chambers 26 and 28, which are shaped such that the liquid to be sprayed is atomized into droplets of a predetermined size and forces out in direction F17 through channel 30 and opening 10 of nozzle head 16 which it exits in direction 19. It is noted that in the illustrated embodiment, mixing chamber 28 is wider than mixing chamber 26. However, in other examples this may be the other way around, or the mixing chamber may comprise a single chamber. It is further noted that mixing chambers 26 and 28 may be shaped differently as the cylindrical/rectangular shape as presented in the illustrated embodiment. For example, mixing chamber 28 may be shaped conically, narrowing towards guiding element 32.

Figure 2B:
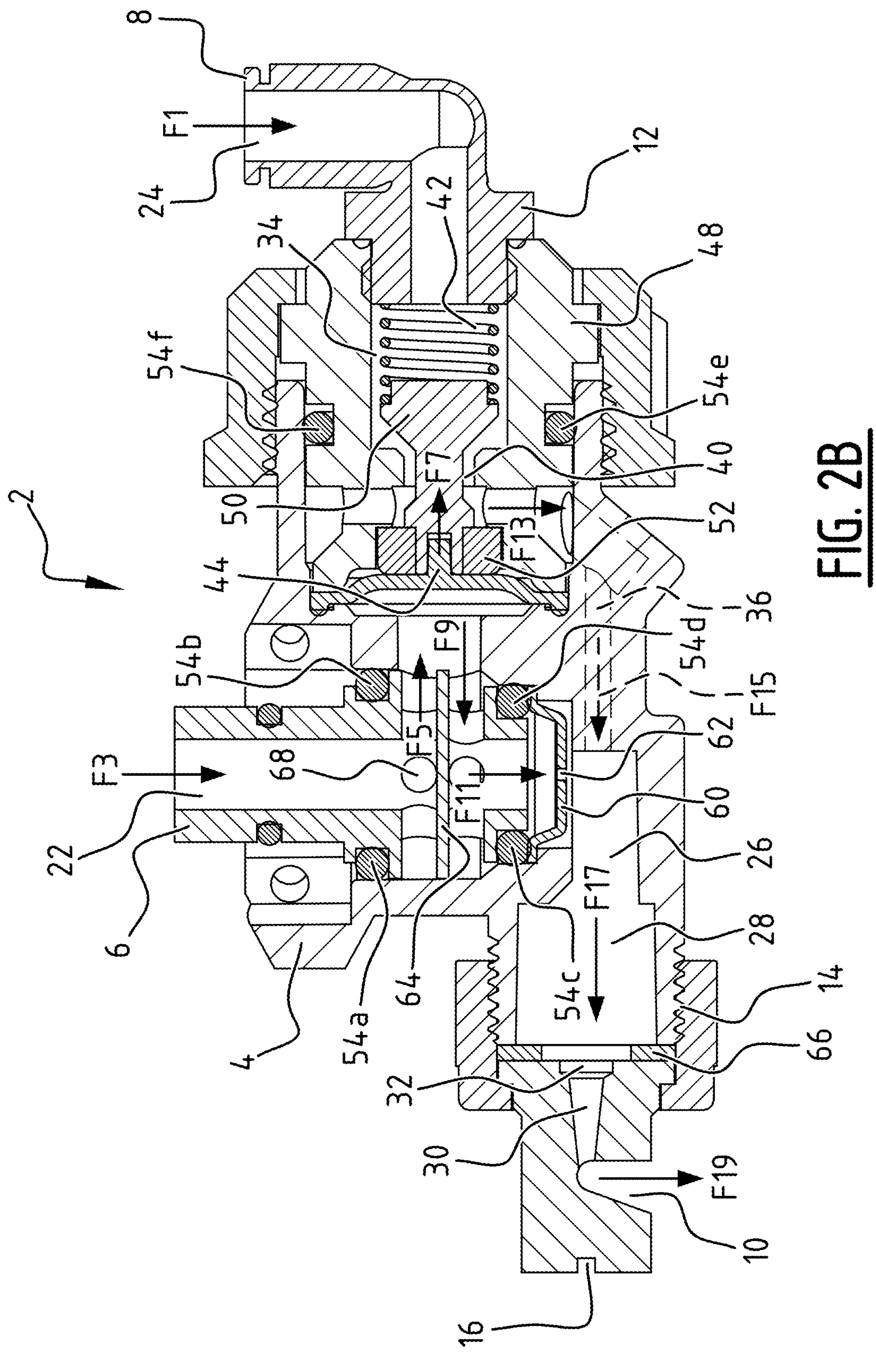
FIG. 2B shows an intersection of the spraying nozzle of FIG. 2A in an open position.

It is further noted that the directions disclosed in FIG. 2B are merely provided to present an approximation of the flow of the liquid to be sprayed and the air flow through the spray nozzle and that the invention is in no way limited to shown direction. For example, the flow out of nozzle head 16 may be much wider than direction F19 suggests and might for example be conically shaped.

Figure 3:
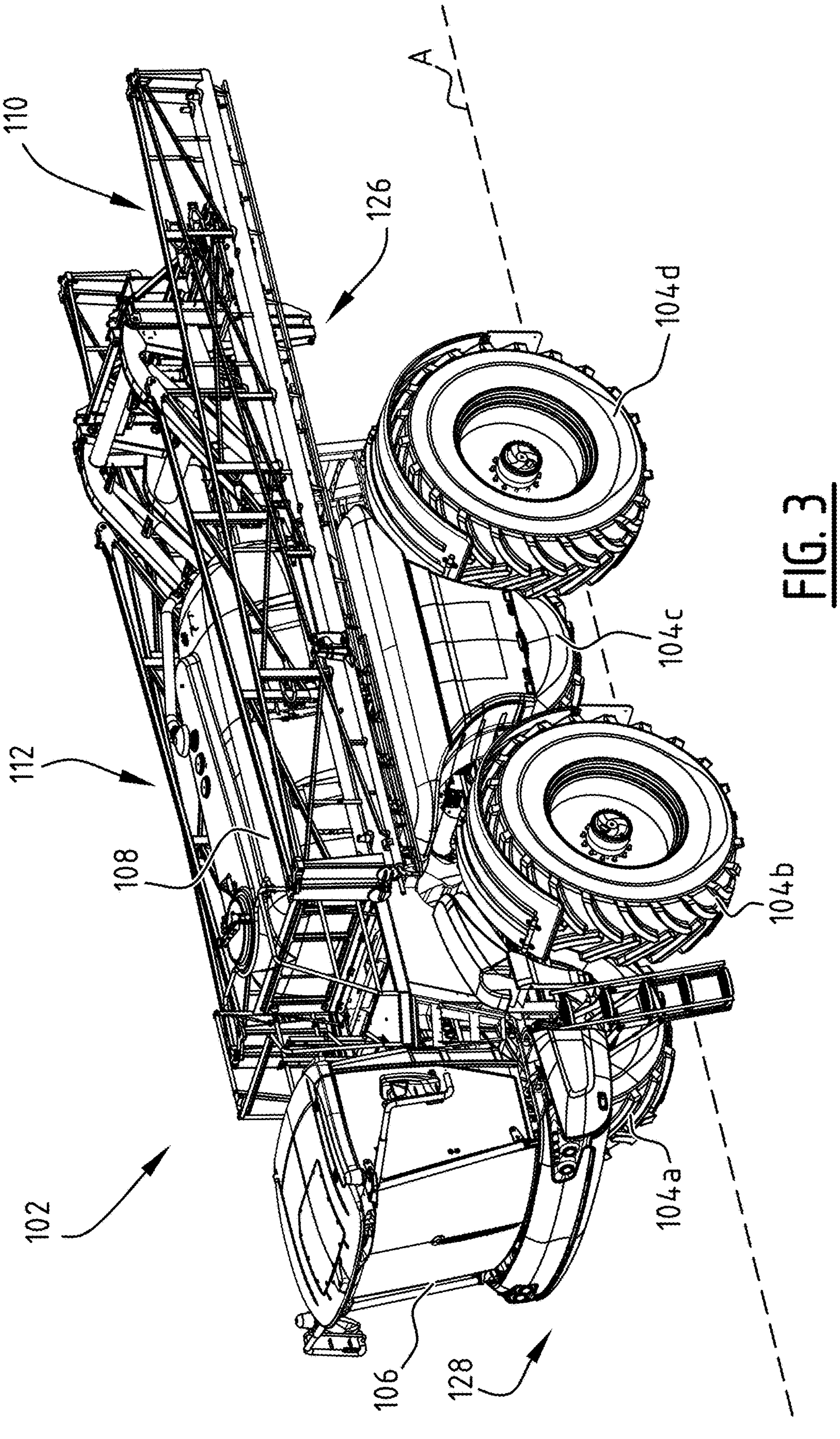
FIG. 3 shows an agricultural device according to the invention.

Agricultural device 102 according to an illustrated example of the invention (FIGS. 3 and 4) shows self-propelled device 102 that is provided with wheels 104*a*-104*d* that are connected to a drive assembly (not shown) and with driver cabin 106 from which an operator can control agricultural device 102. Agricultural device 102 further comprises storage tank 108 in which liquid product to be sprayed over a surface is provided. In this example, agricultural device 102 comprises two booms 110, 112. Boom 110 is provided with longitudinal supply line 114 and spraying nozzles 118*a*-118*x* which are distributed along boom 110. Each of the nozzles 118*a*-118*x* is fluidly connected with longitudinal supply line 114 of boom 10*m* which longitudinal supply line 114 has end portion 122 that is fluidly connected with the spraying pump (not shown). Boom 112 is provided with longitudinal supply line 116 and a plurality of nozzles 120*a*-120*x* which are distributed along boom 112. Each of the nozzles 120*a*-120*x* is fluidly connected with longitudinal supply line 116 of boom 112, which longitudinal supply line 116 has end portion 124 that is fluidly connected with the spraying pump (not shown). Each of spraying nozzles 118*a*-118*x* and 120*a*-120*x* is a spraying nozzle according to the invention, for example of the same type as spraying nozzle 2. In a similar fashion to longitudinal supply lines 114 and 116, booms 110 and 112 both further comprise a secondary supply line (not shown) fluidly connected to each of the nozzles 118*a*-118*x* and 120*a*-120*x* respectively, wherein each secondary supply line is connected to an air pump (not shown).

Figure 4:
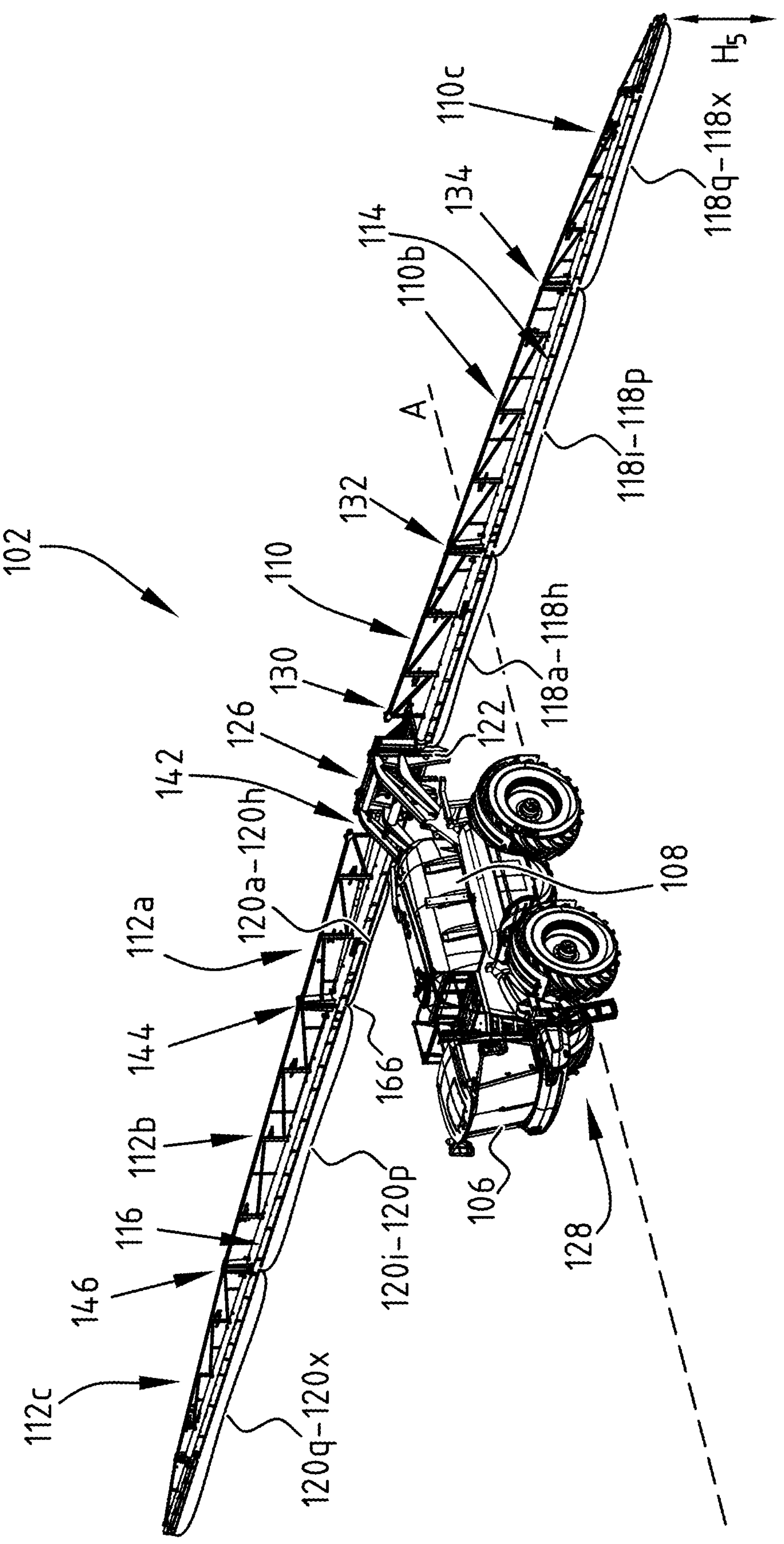
FIG. 4 shows the agricultural device of FIG. 3 during operation in a field.

In the illustrated example, boom 110, 112 each are foldable between a storage position (FIG. 3) and an active spray position (FIG. 4). For this purpose, hinges 130, 132, and 134 divide boom 110 into sections 110*a*, 110*b* and 110*c* and hinges 142, 144 and 146 divide boom 112 into sections 112*a*, 112*b*, and 112*c*. In the active position, booms 110, 112 extend outwardly on opposite sides from the agricultural device 102. In this position, booms 110, 112 extend substantially perpendicular to a central axis A that extends substantially parallel to moving direction D of device 102 from rear end 126 to front end 128 of device 102. In the storage position, each of booms 110, 112 is rotated inwardly over an angle of about 90° and folded, such that in this embodiment each of booms 110, 112 extends at least partially parallel to central axis A of agricultural device 102.

In the current illustrated example according to the invention, spraying nozzles 118*a*-118*x* are grouped into section 118*a*-118*h*, 118*i*-118*p* and 118*q*-118*x* along boom sections 110*a*, 110*b* and 110*c* respectively with each spraying nozzle section having an associated control valve (not shown) between spraying nozzle sections 118*a*-118*h*, 118*i*-118*p* and 118*q*-118*x* and longitudinal supply line 114, such that each spraying nozzle section 118*a*-118*h*, 118*i*-118*p* and 118*q*-118*x* can be enabled or disabled independent of other spraying sections. Similarly, spraying nozzles 120*a*-120*x* are grouped into section 120*a*-120*h*, 120*i*-120*p* and 120*q*-120*x* along boom sections 112*a*, 112*b* and 112*c* respectively with each spraying nozzle section 120*a*-120*h*, 120*i*-120*p* and 120*q*-120*x* having an associated control valve (not shown) between spraying nozzle sections 120*a*-120*h*, 120*i*-120*p* and 120*q*-120*x* and longitudinal supply line 116, such that each spraying nozzle section 120*a*-120*h*, 120*i*-120*p* and 120*q*-120*x* can be enabled or disabled independent of other spraying sections.

During use of agricultural device 102, the supply of the liquid to be sprayed can be enabled or disabled for each spraying nozzle section 118*a*-118*h*, 118*i*-118*p*, 118*q*-118*x*, 120*a*-120*h*, 120*i*-120*p* and 120*q*-120*x* using there associated control valve, whereby the spraying nozzles 118*a*-118*h*, 118*i*-118*p*, 118*q*-118*x*, 120*a*-120*h*, 120*i*-120*p* and 120*q*-120*x* automatically enable or disable the air supply to in reaction to said enabling or disabling the supply of the liquid to be sprayed.

The present invention is by no means limited to the above-described preferred embodiments thereof. It will be clear that different embodiments or components thereof may be combined in the present invention. The rights sought are defined by the following claim within the scope of which many modifications can be envisaged.

The invention claimed is:

1. A spraying nozzle for an agricultural device, the spraying nozzle comprising a body and a nozzle head, the body comprising:
- a first inlet chamber;
- a second inlet chamber; and
- a mixing chamber,
- wherein the first inlet chamber comprises a first inlet configured to receive a first fluid under a first pressure and a first outlet that is fluidly connected to the mixing chamber;
- wherein the second inlet chamber comprises a second inlet configured to accept a second fluid under a second pressure and a second outlet that is fluidly connected with the mixing chamber, and wherein the mixing chamber is fluidly connected to the nozzle head;
- wherein the second inlet chamber further comprises a stopping element positioned between the second inlet and the second outlet, wherein the second inlet is upstream from the stopping element and the second outlet is downstream from the stopping element, and wherein the stopping element is configured to be moveable between a stopping position in which a connection between the second inlet and the second outlet is fluidly closed, and an open position in which the connection between the second inlet and the second outlet is fluidly open,
- wherein the stopping element is operatively connected to a spring configured to hold the stopping element in the stopping position; and
- wherein the body further comprises a membrane or sealed plunger moveably positioned between the first inlet chamber and the second inlet chamber and wherein the membrane or sealed plunger is separate from, and operatively connected to, the stopping element and is configured to move the stopping element towards the open position in reaction to the first fluid entering the first inlet chamber.

2. The spraying nozzle according to claim 1, further comprising the second fluid, wherein the first fluid is a liquid to be sprayed and the second fluid is a gaseous medium.

3. The spraying nozzle according to claim 1, wherein the first inlet chamber comprises a directing element that is configured to direct the first fluid from the first inlet along a first surface of the membrane or sealed plunger towards the first outlet.

4. The spraying nozzle according to claim 3, wherein the first inlet chamber comprises a first channel fluidly connected to the first inlet and a second channel fluidly connected to the first outlet, the first and second channel both extending in a first direction that is parallel to the first surface of the membrane or sealed plunger and wherein the directing is positioned between the first and second channel and comprises at least two directing channels that are positioned perpendicular to the first direction and which are configured to direct a flow from the first channel along the first surface of the membrane or sealed plunger to the second channel.

5. The spraying nozzle according to claim 1, wherein the first outlet comprises a flow constriction element comprising a passage with a predetermined diameter that is smaller than the diameter of the first inlet chamber.

6. The spraying nozzle according to claim 5, wherein the first inlet chamber is removably positioned within the body and wherein the flow constriction element is replaceable comprised in the first outlet.

7. The spraying nozzle according to claim 1, wherein the nozzle head is removably connected to the mixing chamber.

8. The spraying nozzle according to claim 1, wherein a distance the stopping element moves towards the open position positively correlates with the first pressure.

9. The spraying nozzle according to claim 1, wherein the second inlet chamber is removably positioned within the body and wherein the spring is replaceably positioned within the second inlet chamber.

10. A spraying system for an agricultural device, the spraying system comprising a main supply for supplying a liquid to be sprayed, wherein the main supply is operatively connected to a main pumping system via a first supply line and wherein the main pumping system is operatively connected via a second supply line to the first inlets of a spraying nozzle according to claim 1, and wherein the spraying system further comprising an air supply system operatively connected to the second inlets of the plurality of spraying nozzles and configured to supply the second fluid to the spraying nozzles.

11. The spraying system according to claim 10, wherein the spraying system comprises one or more control valves positioned between the main pump and the plurality of spraying nozzles and wherein the spraying system further comprises a spray control system operatively connected to the one or more control valves and configured to control the opening and closing thereof.

12. The spraying system according to claim 11, wherein the one or more control valves comprises pulse width modulation valves, pulse width and frequency modulation valves and/or on/off valves.

13. The spraying system according to claim 10, wherein the plurality of spraying nozzles are grouped in a plurality of spraying group, each spraying group with an associated control valve and/or wherein each spraying nozzles has an associated control valve.

14. An agricultural device for dispensing a liquid product to be sprayed over a surface, the agricultural device comprising the spraying system according to claim 10, the agricultural device further comprising at least one boom along which the plurality of spraying nozzles are positioned.

15. The agricultural device according to claim 14, wherein the spraying system comprises one or more control valves positioned between the main pump and the plurality of spraying nozzles and wherein the spraying system further comprises a spray control system operatively connected to the one or more control valves and configured to control the opening and closing thereof, and wherein the agricultural device further comprises:

a memory with a map containing field information stored thereon;

wherein the spray control system is further configured to receive the field information and control the one or more control valves in accordance with the field information.

16. The agricultural device according to claim 14, wherein the agricultural device is self-propelling.

17. A method for dispending a liquid to be sprayed over a surface, such as an agricultural field, the method comprising:

providing the agricultural device according to claim 14; and dispensing the liquid to be sprayed by using the main pumping system to supply the liquid to be sprayed to a spraying valve.

18. The method according to claim 17, further comprising:

obtaining one or more of a position data, a field information and/or a plant characteristic;

determining an amount of liquid to be sprayed in response to the one or more of the position data, the field information and/or the plant characteristic; and opening and/or closing one or more control valves in accordance with the determined amount of liquid to be sprayed.

* * * * *